(12) United States Patent
Møgedal et al.

(10) Patent No.: US 8,672,366 B2
(45) Date of Patent: Mar. 18, 2014

(54) PIPE COUPLING ARRANGEMENT

(75) Inventors: Knut Møgedal, Asker (NO); Steingrim Thommesen, Oslo (NO)

(73) Assignee: Aker Subsea AS, Lysaker (NO)

( * ) Notice: Subject to any disclaimer, the term of this patent is extended or adjusted under 35 U.S.C. 154(b) by 332 days.

(21) Appl. No.: 13/131,908

(22) PCT Filed: Dec. 11, 2009

(86) PCT No.: PCT/EP2009/066895
§ 371 (c)(1),
(2), (4) Date: May 31, 2011

(87) PCT Pub. No.: WO2010/069863
PCT Pub. Date: Jun. 24, 2010

(65) Prior Publication Data
US 2011/0227336 A1    Sep. 22, 2011

(30) Foreign Application Priority Data
Dec. 15, 2008  (NO) .................................. 20085219

(51) Int. Cl.
*F16L 19/07* (2006.01)
(52) U.S. Cl.
USPC ............................................. 285/323; 285/34
(58) Field of Classification Search
USPC ............................................. 285/34, 35, 323
See application file for complete search history.

(56) References Cited

U.S. PATENT DOCUMENTS

| | | | |
|---|---|---|---|
| 2,310,744 A | | 2/1943 | Osborn |
| 3,345,084 A | * | 10/1967 | Hanes et al. ............. 285/27 |
| 3,679,241 A | * | 7/1972 | Hoffmann ............. 285/340 |
| 3,711,126 A | * | 1/1973 | Hara et al. ............. 285/116 |
| 3,971,576 A | * | 7/1976 | Herd et al. ............. 285/87 |
| 4,209,193 A | | 6/1980 | Ahlstone |
| 4,708,513 A | | 11/1987 | Roche et al. |
| 5,160,172 A | * | 11/1992 | Gariepy ............. 285/18 |
| 5,306,050 A | * | 4/1994 | Laflin et al. ............. 285/119 |
| 5,415,441 A | * | 5/1995 | Kilgore et al. ............. 285/322 |
| 7,568,737 B2 | * | 8/2009 | Wells et al. ............. 285/391 |
| 8,007,009 B2 | * | 8/2011 | Vogel et al. ............. 285/35 |
| 2001/0045286 A1 | | 11/2001 | Pallini et al. |
| 2007/0152441 A1 | | 7/2007 | Jennings et al. |
| 2008/0149390 A1 | | 6/2008 | Fraser et al. |

FOREIGN PATENT DOCUMENTS

| | | |
|---|---|---|
| WO | WO-03/001025 | 1/2003 |
| WO | WO-03/002845 | 1/2003 |

OTHER PUBLICATIONS

Untermann, Nils, "International Search Report", for PCT/EP2009/066895 as mailed Mar. 16, 2010, 4 pages.

* cited by examiner

*Primary Examiner* — James Hewitt
(74) *Attorney, Agent, or Firm* — Winstead PC (57) ABSTRACT

A coupling arrangement having external threads carried on a first pipe element. A second pipe element carries a radially movable locking member with external locking profiles, and a connection sleeve having internal threads that are threaded onto external threads and internal locking profiles that engage with the external locking profiles. The connection sleeve is moved in a first axial direction towards the first pipe element by rotation on the external threads while the internal locking profiles are in an intermediate engagement with the external locking profiles, until the movement is limited by abutting faces of the internal and external locking profiles. At least one of the abutting faces exhibits an inclination resulting in a pull of the connection sleeve towards an axial direction opposite of the first axial direction when the external locking profiles are moved radially.

6 Claims, 6 Drawing Sheets

PIPE COUPLING ARRANGEMENT

The present invention relates to a coupling arrangement and a method for providing a preloaded connection between two pipe elements. In particular, the invention relates to such an arrangement and method for preloaded interconnection of two risers.

BACKGROUND

As is well known by a person skilled in the art, preloading of riser connections or pipe connections limits the tension variations in the coupling, which prolongs the lifetime of the assembly.

Patent application publication US 2008/0149390 describes a preloaded riser coupling system. In this system a misalignment between a locking profile and a facing engaging profile of a radially moveable locking member forces the two pipe elements against each other, resulting in a preload.

U.S. Pat. No. 4,708,513 describes a coupling arrangement for tubular members which provides preloading in the connections. A box and pin end of two tubular members are held together with a preload, by using a tool. Then, while being preloaded, a threaded locking ring is rotated in place on threads until it engages a torus of the pin member, locking the pin and box ends together. The preload is then removed.

Several ways to provide a preloaded connection between risers or other tubular members can be found in the prior art. However, many solutions exhibit disadvantages regarding wear, material fatigue, tolerances of dimensions, the interconnection method, etc. Thus, it is an object of the present invention to provide a coupling arrangement that avoids the drawbacks of the prior art.

THE INVENTION

According to a first aspect of the present invention, there is provided a coupling arrangement for connection of facing ends of two pipe elements, comprising external threads carried on a first pipe element. The coupling arrangement also comprises a second pipe element that carries a radially movable locking member with external locking profiles;

a connection sleeve that comprises internal threads adapted to be threaded onto said external threads and internal locking profiles adapted to engage with said external locking profiles;

wherein said connection sleeve is adapted to be moved in a first axial direction towards said first pipe element by rotation on said external threads while its internal profiles are in an intermediate engagement with said external profiles, until said movement is limited by abutting faces of said internal and external profiles, when possible axial clearances have been closed due to said first axial movement; and wherein at least one of said abutting faces exhibits an inclination resulting in a pull of the connection sleeve towards an axial direction opposite of said first direction, when said external locking profiles are moved radially outwards from said intermediate engagement to a position of further engagement of the internal locking profiles.

With this coupling arrangement according to the first aspect of the present invention, any clearances resulting from production tolerances can be neutralized by the axial movement of the connection sleeve when rotating it on the external threads. That is, due to dimension variations between the end parts of different pipe element, axial clearances may be present. By moving the pipe ends towards each other with the rotation of the connection sleeve, these clearances are removed. Thus, when moving the external locking profiles a predetermined radial distance, from the intermediate engagement into further engagement, inclined faces of the profile will result in pulling the connection sleeve to provide a predetermined preloading of the connection sleeve. Since the said predetermined radial distance is known, the amount of preloading will also be known or predetermined.

By adjusting the said radial distance, the said inclination and/or the dimensions (length and cross section area) of the connection sleeve, the preloading can be adjusted correspondingly.

In the position of intermediate engagement the mutual position of the external and internal profiles is such that their radially extending protrusions overlap in the radial direction. In this position of intermediate engagement, some play may be present in the axial direction.

To facilitate the outwardly radial movement of the external profiles, the coupling arrangement can comprise a wedging member adapted to force the locking member radially outwards by axial movement along an inner face of the locking member. The wedging member can advantageously be forced into a clearance between the locking member and the tubular body of the pipe element.

In a preferred embodiment, the wedging member has an outwardly facing surface which is divided into a plurality of axial surfaces parallel to the longitudinal axis of the second pipe section, wherein the axial surfaces are positioned at different distances from said axis. In such an embodiment, transition surface(s) are interposed between said axial surfaces. The transition surface(s) will preferably have an angle to said longitudinal axis. An inwardly facing surface of the locking member can be arranged correspondingly. When the wedging member is moved axially, it can thus force the locking member radially outwards when the transition surface(s) glide(s) against each other, while not moving it radially when the axial surfaces glide against each other. Since the axial surfaces are parallel to the longitudinal axis of the pipe element, the wedging member will not slip out of the space between the locking member and the pipe element.

The axial surfaces can be strictly planar or have a curvature, for instance about the longitudinal axis of the pipe element. In any case, however, the axial surfaces are substantially parallel to the longitudinal axis of the pipe element on which the locking member is carried.

Furthermore, in this said preferred embodiment, the distance of radially outward movement from the position of intermediate engagement to the position of further engagement can substantially be equal to the difference of the radial distances of two adjacent axial surfaces to the longitudinal axis of the pipe element that carries the locking member. Preferably, these two adjacent axial surfaces are the two with the largest distance to said longitudinal axis.

Preferably, the two said facing ends of the pipe comprise a pin section and a box section, respectively, wherein said sections are shaped by hot forming. Notably, the coupling arrangement according to the first aspect of the present invention advantageously makes it possible to use pipe elements with only small increases of diameter at their ends. Differing from many known solution of the prior art, one can thus manufacture and adapt the ends of the pipe elements without welding. Due to the small increase of diameter, the forming of the ends can preferably be performed using the material already present in a tubular element or piece of pipe.

In yet another embodiment of the first aspect of the invention, the external threads carried on the first pipe element are arranged on the exterior face of a threaded element which is carried by said first pipe element, which threaded element is adapted to be releasably locked in a fixed position on the first pipe element.

According to a second aspect of the present invention, it is disclosed a method for providing a preloaded interconnection between two ends of coaxially facing pipe elements, of which a first pipe element carries external threads. The method comprises the following steps:

(a) threading a connection sleeve onto said external threads and arranging said ends in such a mutual position that internal locking profiles of the connection sleeve are aligned with external locking profiles of a locking member, the locking member being carried on a second pipe element;

(b) moving said external locking profiles radially outwards into intermediate engagement with the internal locking profiles;

(c) moving the connection sleeve in a first axial direction towards the first pipe element by rotating it on said external threads until said axial movement is limited by abutting faces of said internal and external profiles, when possible axial clearances have been closed due to said first axial movement;

(d) moving said external locking profiles further radially outwards until a position of further engagement is provided between said external and internal locking profiles, thereby exerting force on the inner locking profile of the connection sleeve in a second axial direction which is opposite of the first, due to an inclination of at least one of said abutting faces.

The method disclosed above is also meant to include threading the connection sleeve onto the external threads, and thereafter attach the external threads to the first pipe element.

Step (d) in the method according to the second aspect of the invention can be performed by forcing a wedging member axially along an inner face of the locking member.

According to the appropriate embodiment or use of the arrangement or method according to the present invention, the locking member can be any suitable component adapted for moving outwardly facing external profiles into engagement with the internal profiles. Examples of such components are split rings, sleeves, dogs, etc.

Also, one can also imagine that the internal profiles are indirectly coupled to the connection sleeve, for instance by being part of a separate member attached to the connection sleeve.

In order to obtain advantageous effects or function of the preloading, the connection sleeve should preferably be relatively long and thin. Such characteristics makes it relatively extensible compared to the end sections of the pipe elements. However, it must of course be dimensioned to maintain substantial forces appearing in the preloaded connection. Furthermore, the structures of the pipe elements between the threads and the profiles should be relatively stiff, as compared to the connection sleeve.

Referring to both aspects of the present invention, the term further engagement can be replaced by the term predetermined further engagement in those embodiments where the movement from the intermediate engagement to the further engagement is performed or is adapted to take place over a predetermined distance.

EXAMPLE OF EMBODIMENT

In the following, a detailed example of embodiment will be given in order to illuminate the functions, components, and the advantages of the present invention more thoroughly. The example is given with reference to the drawings, in which.

Figure 1:
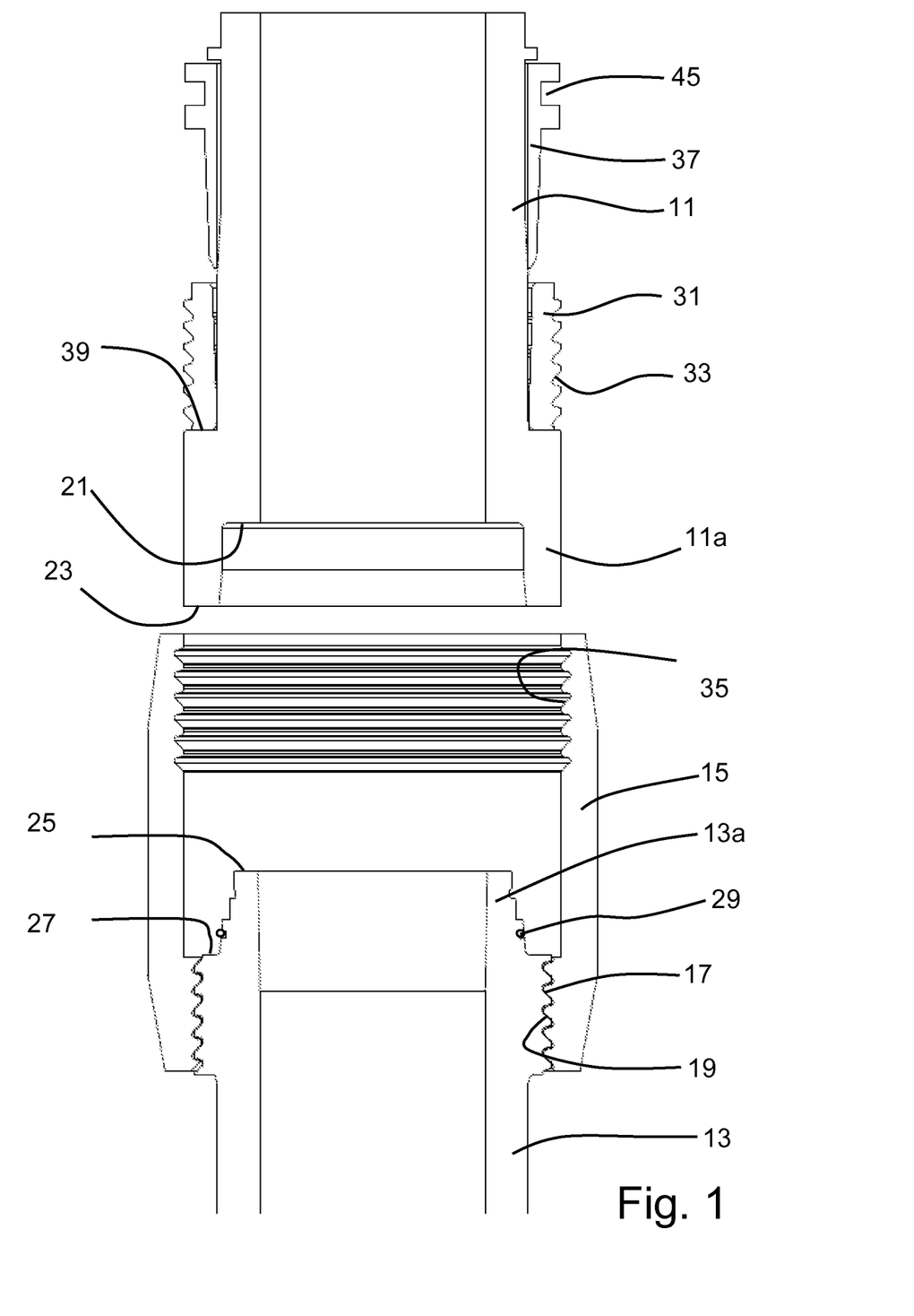
FIG. 1 shows a cross section view of two interconnectable opposite ends of riser elements provided with a coupling arrangement according to the present invention.

In this example of embodiment, a process will be described, where two riser elements 11, 13 are being interconnected with a coupling arrangement according to the present invention. FIG. 1 shows the lower part of an upper riser element 11 and an upper part of a lower riser element 13. The lower riser element 13 has a pin section 13a adapted to stab into a facing box section 11a of the upper riser element 11. However, before guiding the box and pin sections together, a connection sleeve 15 is threaded onto the lower riser element 13. The lower riser element 13 exhibits external threads 17, whereas the connection sleeve 15 correspondingly exhibits internal threads 19 adapted to be threaded onto the external threads 17.

Figure 2:
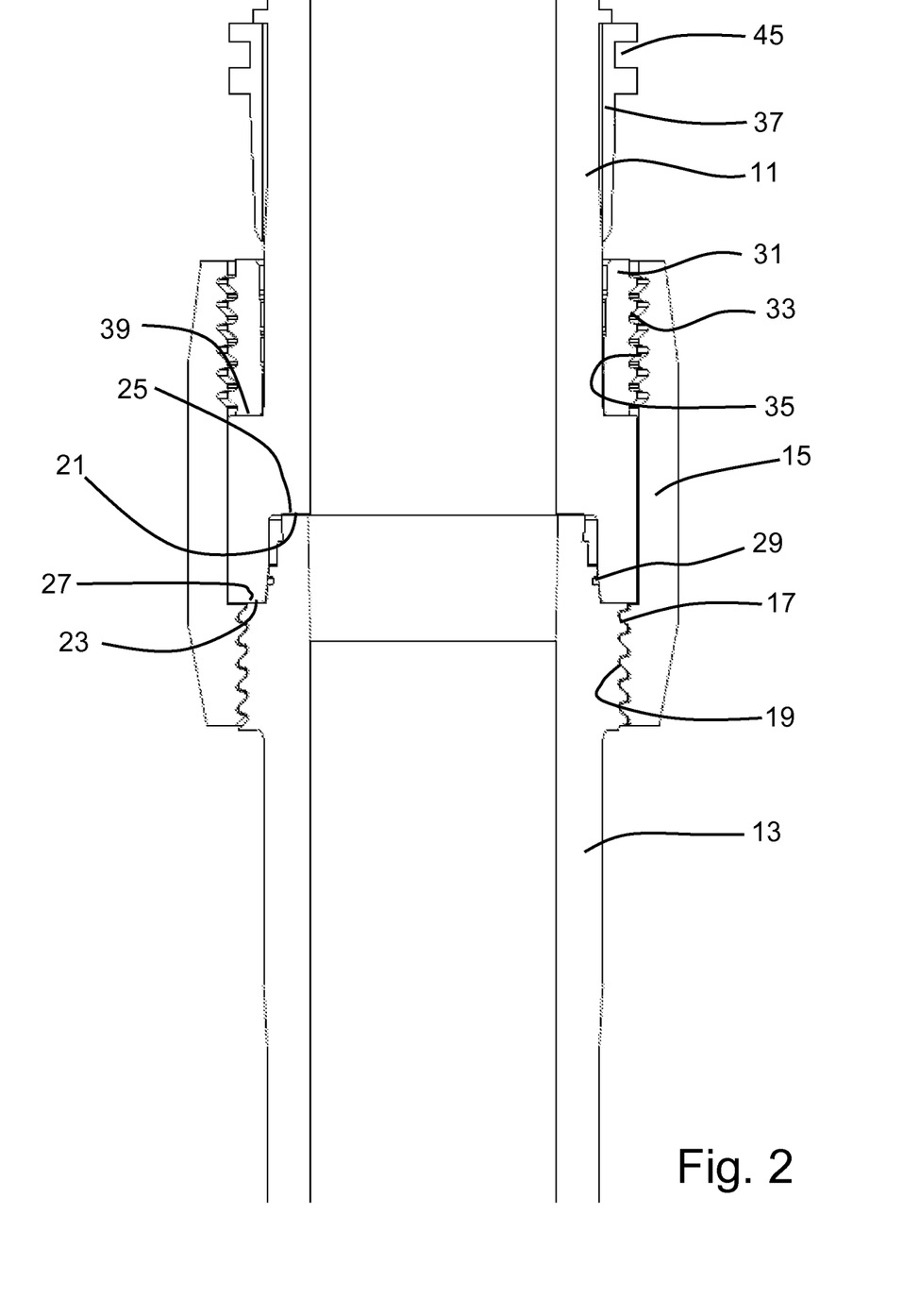
FIG. 2 shows the ends of the riser elements in FIG. 1, wherein the ends have been moved together, however not interconnected.

It is now also referred to FIG. 2, showing the upper and lower riser elements 11, 13 arranged together. In this position, one or both of downwardly facing first and second surfaces 21, 23 of the upper riser element 11 will abut against upwardly facing first and/or second surfaces 25, 27, respectively, of the lower riser element 13. In this position, a seal 29 arranged to the pin section 13a will seal against an inner face of the box section 11a.

A radially movable locking member in form of a split ring 31 is arranged about the upper riser element 11. The split ring 31 has outwardly facing locking profiles 33 which are adapted to engage with inwardly facing locking profiles 35 of the connection sleeve 15. However, in the position shown in FIG. 2, the profiles 33 and 35 are not in engagement. Instead, the connection sleeve 15 can move freely in the axial direction over the split ring 31. The profiles 33, 35 could also be in the form of threads. However, profiles without the pitch of threads are preferred in this embodiment.

Figure 3:
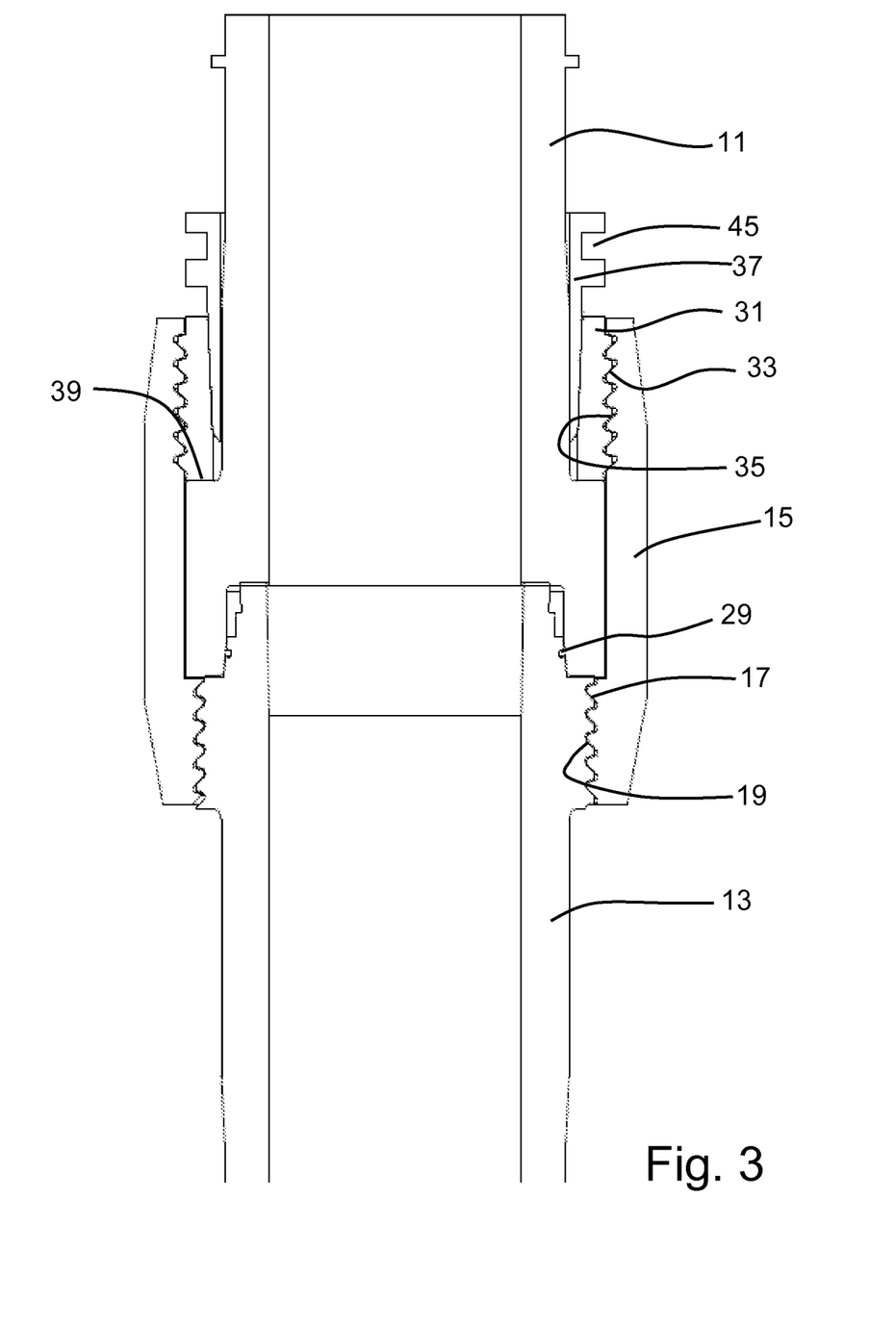
FIG. 3 shows the ends of the riser elements in FIG. 1, wherein an additional step of the connection process has been performed.

Referring now to FIG. 3, a wedging member in the form of a wedging ring 37 is moved an axial distance onto the space between the exterior surface of the upper riser element 11 and the inner face of the split ring 31. This movement forces the split ring 31 radially outward to an extent where the protrusions of the locking profiles 33 of the split ring extend into the recesses of the facing locking profiles 35 of the connection sleeve 15. However, a tight engagement is not obtained. In this situation, the external profiles 33 of the split ring 31 are moved into an intermediate engagement with the internal profiles 35 of the connection sleeve 15.

Figures 5, 6:
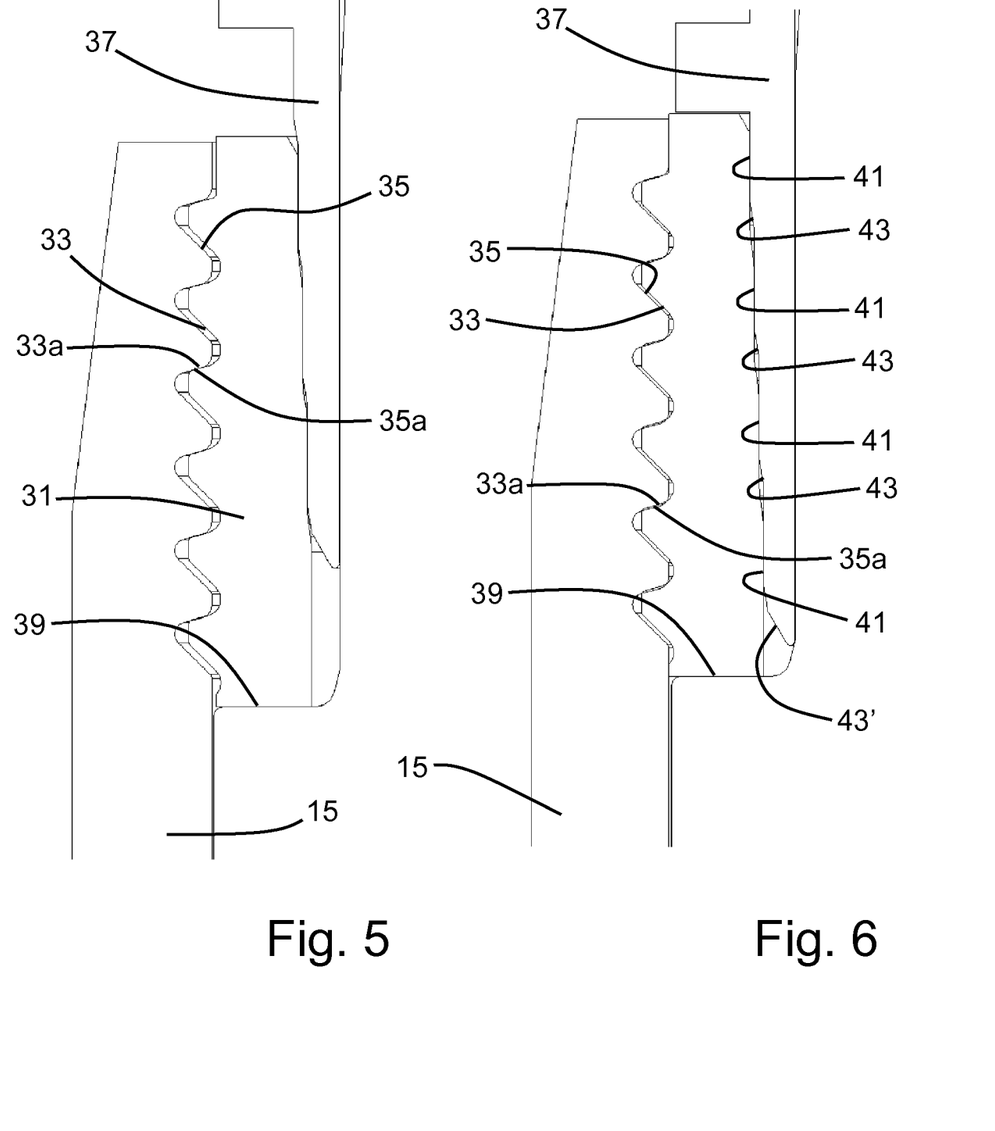
FIG. 5 is a detail of the coupling arrangement, before preloading.
FIG. 6 is the same detailed view as in FIG. 5, after preloading.

After this step, the connection sleeve 15 is now rotated on the external threads 17 of the lower riser element 13. The direction of rotation is such that the connection sleeve 15 moves axially against the lower riser element 13 (or downwards in FIG. 3). This rotation is performed to such an extent that there is no play between the upper and lower riser element 11, 13, and that the split ring 31 is properly moved such that it abuts downward against an upwardly facing shoulder 39 on the upper riser element 11. Thus, this rotating movement of the connection sleeve 15 eliminates any clearances. After this rotation step, the locking profiles 35 of the connection sleeve 15 will exert a downwardly directed force against the locking profiles 33 of the split ring 31. FIG. 5 shows their mutual position in more detail. One will appreciate that there still is some lateral or radial clearance between the profiles 33, 35. Also, one sees that upwardly facing surfaces of the locking profiles 33 of the split ring 31 abut against downwardly facing surfaces of the locking profiles 35 of the connection sleeve 15.

Figure 4:
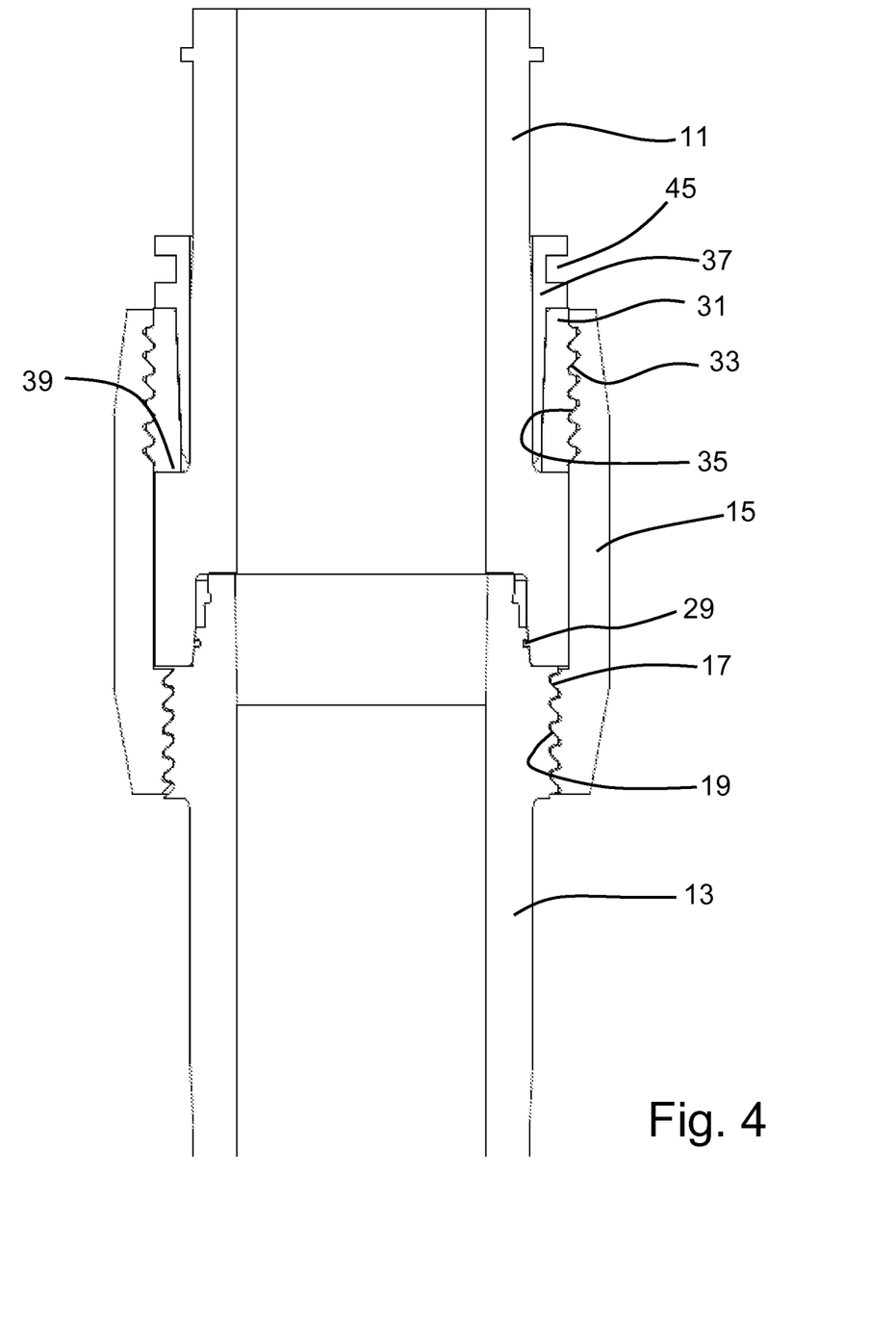
FIG. 4 shows the ends of the riser elements in FIG. 1, wherein the said ends have been connected with a preload.

To complete the preloaded interconnection between the upper and lower riser element 11, 13, the wedging member in the form of a wedging ring 37 is moved further down to its end position, see FIG. 4. This movement of the wedging ring 37 moves the split ring 31 an additional distance radially outwards. This is shown in greater detail in FIG. 6. In addition, the locking profiles 33, 35 of the split ring 31 and the connection sleeve 15, respectively, have moved into further engagement.

As appears from FIG. 5 and FIG. 6, the upwardly facing surfaces of the locking profiles 33 of the split ring 31, abutting against said downwardly facing surfaces of the locking profiles 35 of the connection sleeve 15, have an inclination. The inclination results in that, when moving into further engagement, the connection sleeve 15 is exposed to axially upwardly directed forces by the locking profiles 33 of the split ring 31, as the split ring 31 is forced radially outward. The connection sleeve 15, being threaded onto the lower riser element 13, is thus preloaded by the last downwardly movement of the wedging ring 37. In this way, a preloaded connection between the two riser elements 11, 13 is provided.

Of course, the movement from the intermediate engagement to the further engagement of the external and internal profiles 33, 35 can also take place before the last possible wedging movement of the wedging member or wedging ring 37. One can thus imagine leaving for instance one possible additional wedging movement, making it possible to preload the connection even further, or in two preloading steps.

As can be seen best in FIG. 5 and FIG. 6, the abutting surfaces of the wedging ring 37 and the split ring 31 (locking member) are divided into four axial surfaces 41 with different diameter and transition surfaces in the form of three tapered surfaces 43 interposed in between the axial surfaces 41. For simplicity, only the surfaces 41, 43 of the wedging ring are numerated. However, as can be appreciated from FIG. 5 and FIG. 6, both said abutting surfaces have axial surfaces and tapered surfaces. The lowermost tapered surface 43' of the wedging ring 37 forms a thin lower edge of the wedging ring 37, which renders it possible to guide the wedging ring 37 into the space between the split ring 31 and the upper riser element 11.

The increase of diameter between each succeeding axial surface 41 corresponds to the stepwise radial outwardly movement of the split ring 31 as the wedging ring 37 is moved stepwise into the space between the split ring 31 and the upper riser element 11. Thus, the preloading of the connection sleeve 15 depends on the increase of diameter and the inclination of the aforementioned abutting surfaces of the locking profiles 33, 35. Referring to FIG. 5 and FIG. 6, these inclined surfaces are numerated 33a and 35a. A possible difference of diameter between two adjacent axial surfaces 41 can be 1 mm. It can also be more or less, depending on the desired preloading and dimensions and character of the coupling arrangement and the riser elements themselves.

One can also imagine using a wedging member with only one axial surface 41, in which case the wedging movement of the wedging member will move the external locking profiles 33 from the intermediate engagement to the further engagement. However, using two or more axial surfaces 41, as in the embodiment described with reference to the drawings, is considered to make the movement into the intermediate engagement easy.

Furthermore, one can also imagine the transition surface(s) being arranged only in the locking member.

The axial surfaces 41 and the transition surfaces 43 do not have to be in the form of rings or sections of rings. For instance, the wedging member 37 can be a plurality of separate wedges distributed about the outer surface of the upper riser element 11. The general requirement is that it fulfils the function of moving the locking member 31 radially outwards. One can also imagine other ways to force the locking member outwards.

An advantage resulting from the use of the wedging member 37 is that one obtains a large radially directed force as a result of, in comparison, a small axial force on the wedging member 37. Thus, a tool performing the wedging movement does not have to be inappropriately large. In some cases, it should even be possible to obtain the preloading with manual strength.

The locking member can also be of another shape, such as a plurality of dogs with locking profiles. Such dogs can engage the connection sleeve at predetermined positions. Thus, the locking profiles of the connection sleeve do not have to be engaged along their entire circumference.

One can also imagine a solution where the wedging member 37 is without the axial surfaces, for instance being tapered. However, the risk of the wedging member 37 slipping out of the space between the locking member 31 and the riser element 11 would then be present. Furthermore, the amount of radial movement of the external locking profiles 33 would depend on the distance of axial movement of the wedging member 37. Thus, the solution as presented in FIG. 5 and FIG. 6 exhibit substantial advantages.

An advantage of the coupling arrangement according to the present invention, for instance as illustrated with the accompanying drawings, is that the largest outer diameter of the arrangement is small compared to other known arrangements. Also, when regarding the threads 17 of the lower riser element, as well as the box section 11a of the upper riser element 11, one will see that the threads 17 and the box section 11a only has a slightly larger diameter than the main part of the riser element 11, 13. This feature advantageously makes it possible to manufacture the ends of the riser elements 11, 13 by hot forming. Thus, welding can be avoided, whereby a plurality of advantages is obtained. Firstly, one avoids the risk of failure in welded joints. Secondly, a cheaper manufacturing process is possible.

Off course, one riser element, being a lower or upper element 11, 13, will normally comprise a box section 11a in its one end and a pin section 13a and threads 17 in its other end.

Another advantage of the coupling arrangement according to the invention is that, since the effect of production variations, or dimension tolerances, is neutralized due to the configuration of the coupling arrangement, one can produce riser elements or pipes with lower requirements with regard to production tolerances. Thus, the riser elements or pipes can be produced more cheaply.

Yet another advantage is that one does not need to preload the riser elements (or pipes) by forcing them against each other before the connection is made up. Such a connection process would require heavy and space-demanding equipment which is avoided with the coupling arrangement according to the present invention.

The components of the coupling arrangement that are exposed of most wear and tear are the ones that are moved under large forces. In the coupling arrangement described above with reference to the figures, such parts will be the wedging member or wedging ring 37, and the locking member or split ring 31, as well as the connection sleeve 15. An advantageous feature of the present invention is that all of these parts can be readily replaced. Thus, one can keep using the riser elements 11, 13 for a long time without having to replace them. Instead, wear parts, as the ones mentioned above, can be replaced quickly and with a low cost.

Preferably a tool will be used for making up the connection. This will provide control of the rotational force when rotating the connection sleeve 15 on the threads 17. At the upper end of the wedging member or the wedging ring 37 there is arranged a groove 45 for engagement with a tool for forcing the wedging ring 37 downward or upward along the axis or the riser element 11, see FIG. 1.

Wedging member 37 can also have another configuration, for instance as dogs or a ring which is split into two or more parts.

Figure 7:
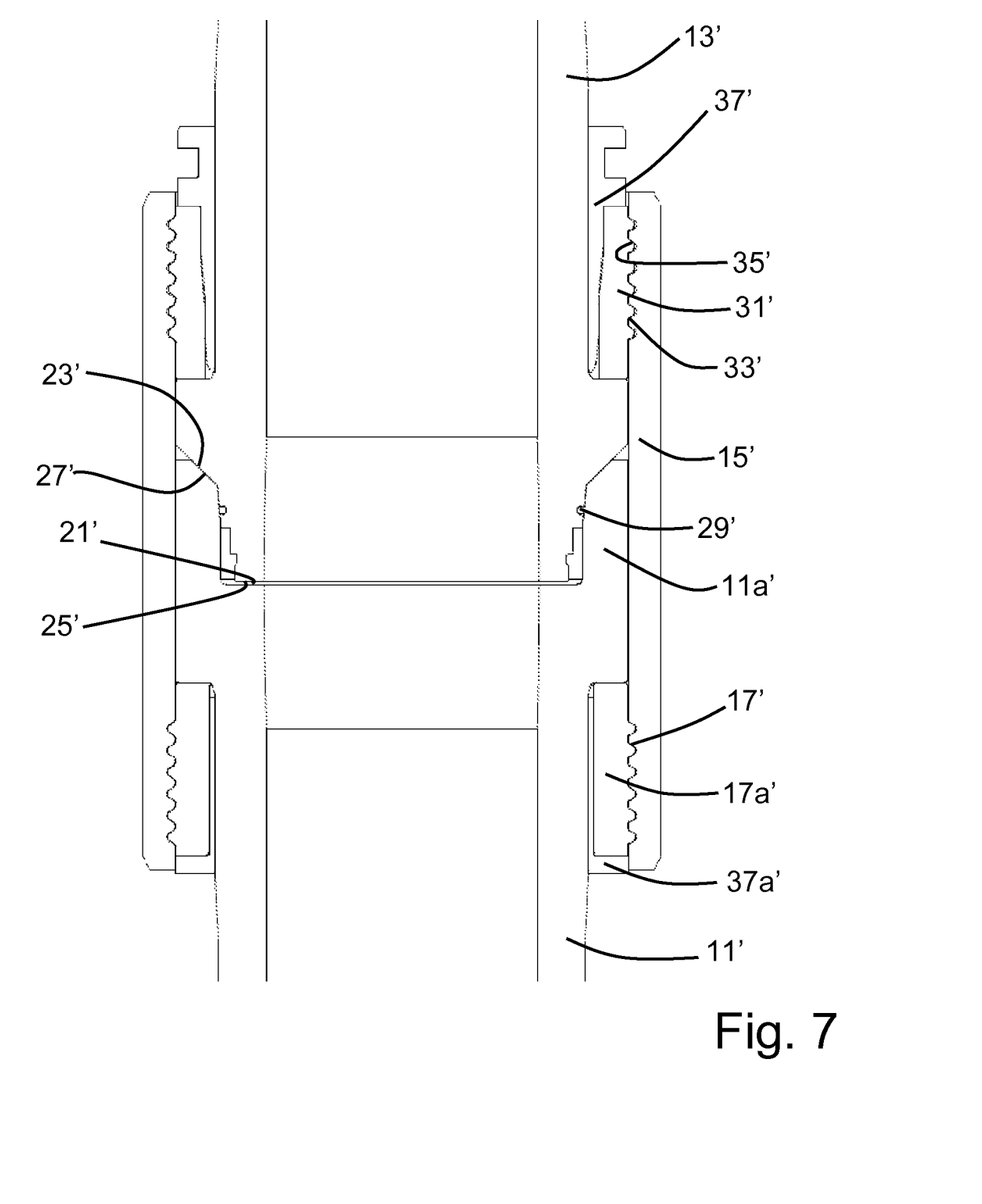
FIG. 7 shows a cross section view of an early proposal leading to the solution shown in FIG. 1.

FIG. 7 shows an early proposal for a coupling arrangement, leading to the arrangement according to the present invention. Here, the locking member 31' is arranged on the riser element 13' that has a pin section 13a'.

Instead of the threads 17 of the solution shown in FIG. 1 to FIG. 4, the riser element 11' carries a profiled member 17a' with external profiles 17'. The profiled member 17a' is not an integral part of the riser element 11', but can be fixed to the riser element 11' by a second wedging member 37a'. Thus, with the embodiment shown in FIG. 7, both the external locking profiles 33' and 17' can easily be replaced in case of damage or excessive wearing.

The solution shown in FIG. 7 has a very similar configuration as the one shown in FIG. 1 to FIG. 4. However, with profiles 17' instead of the threads 17, one is not able to tighten the riser elements 11', 13' together before applying the pre-load. As a result of this, variations on dimensions will result in different preloading, since the tolerances are not compensated.

Furthermore, in the embodiment shown in FIG. 7, the facing second surfaces 23', 27' of the two riser elements 11', 13' are tapered.

In a not illustrated embodiment, the profiles 17' on the profiled element 17a' in FIG. 7 is replaced with threads. In such a configuration, the threads would be easily replaceable by replacement of the profiled element 17a'.

The invention claimed is:

1. A coupling arrangement connecting facing ends of two pipe elements, comprising:
    external threads carried on a first pipe element;
    a second pipe element that carries a radially movable locking member with external locking profiles;
    a connection sleeve that comprises internal threads that are threaded onto said external threads and internal locking profiles that engage with said external locking profiles;
    wherein said connection sleeve is moved in a first axial direction towards said first pipe element by rotation on said external threads while said internal locking profiles are in an intermediate engagement with said external locking profiles, until said movement is limited by abutting faces of said internal and external locking profiles when possible axial clearances have been closed due to said first axial direction movement;
    wherein at least one of said abutting faces exhibits an inclination resulting in a pull of the connection sleeve towards an axial direction opposite of said first axial direction when said external locking profiles are moved radially outwards from said intermediate engagement to a position of further engagement of the internal locking profiles; and
    wherein said outwardly radial movement of the external locking profiles is provided by axial movement of a wedging member between an outer face of the second pipe element and the radially movable locking member.

2. A coupling arrangement according to claim 1, wherein the wedging member comprises an outwardly facing surface which is divided into a plurality of axial surfaces parallel to a longitudinal axis of the second pipe element, the plurality of axial surfaces being positioned at different distances from said axis, and that transition surface(s) are interposed between said plurality of axial surfaces.

3. A coupling arrangement according to claim 2, wherein a distance of radially outward movement from a position of intermediate engagement to the position of further engagement is substantially equal to a difference of radial distances of two adjacent axial surfaces from the longitudinal axis of the second pipe element carrying the radially movable locking member.

4. A coupling arrangement according to claim 1, wherein the said facing ends of said pipe elements comprise a pin section and a box section, wherein said sections are shaped by hot forming.

5. A coupling arrangement according to claim 1, wherein:
    the external threads carried on the first pipe element are arranged on an exterior face of a profiled member which is carried by said first pipe element; and
    the profiled member is releasably locked in a fixed position on the first pipe element.

6. A method for providing a preloaded interconnection between two ends of coaxially facing pipe elements of which a first pipe element carries external threads, the method comprising:
    (a) threading a connection sleeve onto said external threads and arranging said ends in such a mutual position that internal locking profiles of the connection sleeve are aligned with external locking profiles of a locking member, the locking member being carried on a second pipe element;
    (b) moving said external locking profiles radially outwards into intermediate engagement with the internal locking profiles;
    (c) moving the connection sleeve in a first axial direction towards the first pipe element by rotating the connection sleeve on said external threads until said first axial direction movement is limited by abutting faces of said internal and external locking profiles when possible axial clearances have been closed due to said first axial direction movement;
    (d) moving said external locking profiles further radially outwards until a position of further engagement is provided between said external and internal locking profiles, thereby exerting force on the internal locking profiles of the connection sleeve in a second axial direction which is opposite of the first axial direction, due to an inclination of at least one of said abutting faces; and
    wherein said outwardly radial movement of the external locking profiles is provided by axial movement of a wedging member between an outer face of the second pipe element and the radially movable locking member.

* * * * *